US012572419B2

(12) United States Patent
Teng

(10) Patent No.: US 12,572,419 B2
(45) Date of Patent: Mar. 10, 2026

(54) METHOD AND APPARATUS FOR PERFORMING DATA ACCESS CONTROL OF MEMORY DEVICE

(71) Applicant: Silicon Motion, Inc., Hsinchu County (TW)

(72) Inventor: Duen-Yih Teng, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 28 days.

(21) Appl. No.: 18/882,713

(22) Filed: Sep. 11, 2024

(65) Prior Publication Data

US 2025/0110828 A1 Apr. 3, 2025

(30) Foreign Application Priority Data

Oct. 2, 2023 (TW) ................................. 112137621

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
None
See application file for complete search history.

(56) References Cited

U.S. PATENT DOCUMENTS

| | | | |
|---|---|---|---|
| 9,419,655 B2 * | 8/2016 | Cai | G06F 11/1048 |
| 2015/0135031 A1 * | 5/2015 | Cohen | G11C 29/52 |
| | | | 714/752 |

(Continued)

FOREIGN PATENT DOCUMENTS

| | | |
|---|---|---|
| CN | 109697176 A | 4/2019 |
| CN | 110322920 A | 10/2019 |

(Continued)

OTHER PUBLICATIONS

Lim SH, Park KW. Compression-Assisted Adaptive ECC and RAID Scattering for NAND Flash Storage Devices. Sensors (Basel). May 22, 2020;20(10):2952. doi: 10.3390/s20102952. PMID: 32456045; PMCID: PMC7287968. (Year: 2020).*

(Continued)

*Primary Examiner* — Daniel F. McMahon
(74) *Attorney, Agent, or Firm* — Winston Hsu

(57) ABSTRACT

A method for performing data access control of a memory device includes: receiving a plurality of host commands from a host device for performing data access upon a non-volatile (NV) memory according to the plurality of host commands, wherein the data access includes data reading; and performing a read optimization procedure for maintaining correctness of the data reading, for example: performing reading operation to obtain multiple channel values; performing compression operation to convert multiple first soft bits in any channel value into multiple second soft bits, to generate a compressed channel value for being buffered in volatile memory; reading multiple compressed channel values from the volatile memory; and utilizing a low-density parity-check (LDPC) code decoding engine circuit to perform LDPC code decoding according to the multiple compressed channel values, and utilizing an error recovery circuit to perform error recovery operation according to the multiple channel values, to generate error-free data.

11 Claims, 14 Drawing Sheets

(56) References Cited

U.S. PATENT DOCUMENTS

| 2015/0301887 A1 * | 10/2015 | Zhang ............... H03M 13/1111 |
| | | 714/764 |
| 2017/0046220 A1 * | 2/2017 | Sharon .................. G06F 3/0679 |
| 2017/0255518 A1 * | 9/2017 | Achtenberg ...... H03M 13/2927 |
| 2020/0218605 A1 | 7/2020 | Subramanian |
| 2024/0427520 A1 * | 12/2024 | Kang ................... G06F 3/0679 |

FOREIGN PATENT DOCUMENTS

| CN | 115810384 A | 3/2023 |
| TW | 202013187 A | 4/2020 |
| TW | 202113610 A | 4/2021 |
| TW | 202123241 A | 6/2021 |
| TW | 202205811 A | 2/2022 |

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, (Year: 2017).*

* cited by examiner

Sign_bit(j)     {Soft_bit_org(j, k) | k = 1, ⋯, (m - 1)}

| B0 | + | B1 | B2 | B3 | B4 | B5 | e.g., :
00000, 00001, ⋯, 11111

Sign_bit(j)     {Soft_bit_new(j, k) | k = 1, ⋯, (n - 1)}

| B0 | + | B1' | B2' | e.g., :
00, 01, 10, 11

—— Non-interfered programming state of target memory cell
—·—— Programming state of helper memory cell #q
——·—— Interfered programming state of target memory cell —— Non-interfered programming state of target memory cell
—--— Programming state of helper memory cell #q
—-— Interfered programming state of target memory cell ———— Previous bits ——-—— Subsequent bits, without ISI, after performing DFE ——-—— Subsequent bits, with ISI, before performing DFE

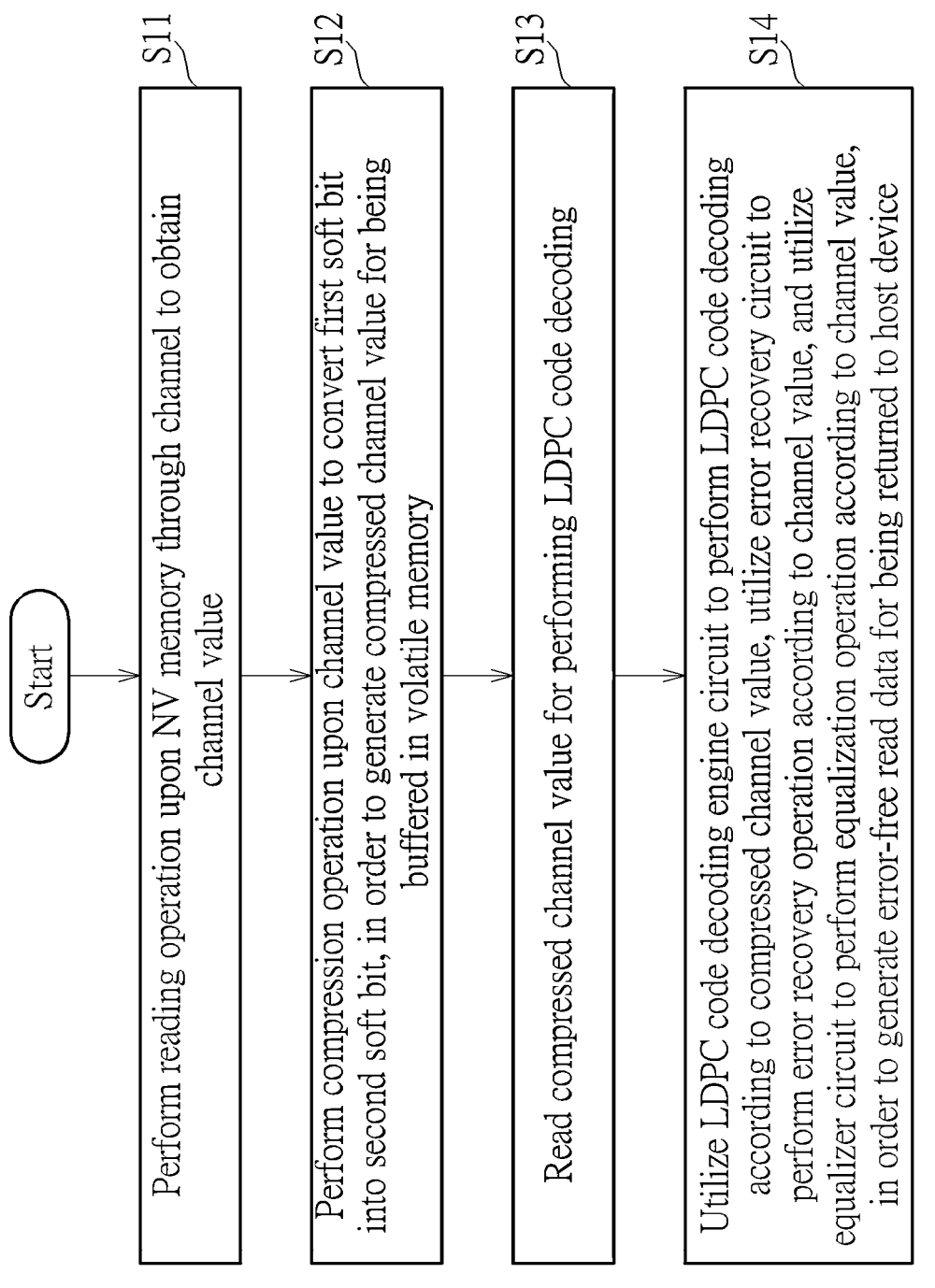

FIG. 11

Start

S11
Perform reading operation upon NV memory through channel to obtain channel value S12
Perform compression operation upon channel value to convert first soft bit into second soft bit, in order to generate compressed channel value for being buffered in volatile memory S13
Read compressed channel value for performing LDPC code decoding S14
Utilize LDPC code decoding engine circuit to perform LDPC code decoding according to compressed channel value, utilize error recovery circuit to perform error recovery operation according to channel value, and utilize equalizer circuit to perform equalization operation according to channel value, in order to generate error-free read data for being returned to host device

METHOD AND APPARATUS FOR PERFORMING DATA ACCESS CONTROL OF MEMORY DEVICE

BACKGROUND OF THE INVENTION

1. Field of the Invention

The present invention is related to memory control, and more particularly, to a method for performing data access control of a memory device, and an associated apparatus (e.g., the memory device, a memory controller within the memory device, and an electronic device including the memory device).

2. Description of the Prior Art

Access management of a memory device including a flash memory for storing data may be complicated. The memory device may be a memory card, a solid state drive (SSD), or an embedded storage device such as that conforming to universal flash storage (UFS) specifications. When manufacturers try to use downgraded flash memory dies to reduce overall costs, certain problems may occur. Specifically, the downgraded flash memory dies have unstable characteristics and are prone to data errors, which may result in reduced overall performance of the memory device. Related art solutions have tried to correct the problem, but further problems may be introduced.

Thus, a novel method and associated architecture are needed for solving the problems without introducing any side effect or in a way that is less likely to introduce a side effect.

SUMMARY OF THE INVENTION

It is therefore one of the objectives of the present invention to provide a method for performing data access control of a memory device, and an associated apparatus (e.g., the memory device, a memory controller within the memory device, and an electronic device including the memory device), to address the above-mentioned issues.

According to at least one embodiment of the present invention, a method for performing data access control of a memory device is provided, wherein the method may be applied to a memory controller of the memory device, the memory device may comprise the memory controller and a non-volatile (NV) memory, and the NV memory may include at least one NV memory element (e.g., one or more NV memory elements). The method may comprise: receiving a plurality of host commands from a host device for performing data access upon the NV memory according to the plurality of host commands, wherein the data access comprises data reading; and in response to at least one read command, performing a read optimization procedure for maintaining correctness of the data reading, wherein the plurality of host commands comprise the at least one read command. For example, the read optimization procedure may comprise: performing at least one reading operation upon the NV memory through at least one channel among multiple channels to obtain multiple channel values, wherein any channel value among the multiple channel values comprises a sign bit and multiple first soft bits; performing at least one compression operation upon the multiple channel values to convert the multiple first soft bits in the channel value into multiple second soft bits in order to generate a compressed channel value corresponding to the channel value, the compressed channel value for being buffered in a volatile memory within the memory controller, wherein a second bit count of the multiple second soft bits is less than a first bit count of the multiple first soft bits; reading multiple compressed channel values from the volatile memory for performing low-density parity-check (LDPC) code decoding, wherein the multiple compressed channel values correspond to the multiple channel values, respectively; and utilizing an LDPC code decoding engine circuit to perform the LDPC code decoding according to the multiple compressed channel values, and utilizing an error recovery circuit to perform at least one error recovery operation according to the multiple channel values, in order to generate error-free read data for being returned to the host device.

In addition to the above method, the present invention also provides a memory controller of a memory device, wherein the memory device comprises the memory controller and an NV memory, and the NV memory comprises at least one NV memory element (e.g., one or more NV memory elements). In addition, the memory controller comprises a processing circuit that is arranged to control the memory controller according to a plurality of host commands from a host device, in order to allow the host device to access the NV memory through the memory controller. The memory controller further comprises a transmission interface circuit that is arranged to perform communications with the host device. In addition, the memory controller receives the plurality of host commands from the host device through the transmission interface circuit within the memory controller, for performing data access upon the NV memory according to the plurality of host commands, wherein the data access comprises data reading. In response to at least one read command, the memory controller performs a read optimization procedure for maintaining correctness of the data reading, wherein the plurality of host commands comprise the at least one read command. For example, the read optimization procedure may comprise: performing at least one reading operation upon the NV memory through at least one channel among multiple channels to obtain multiple channel values, wherein any channel value among the multiple channel values comprises a sign bit and multiple first soft bits; performing at least one compression operation upon the multiple channel values to convert the multiple first soft bits in the channel value into multiple second soft bits in order to generate a compressed channel value corresponding to the channel value, the compressed channel value for being buffered in a volatile memory within the memory controller, wherein a second bit count of the multiple second soft bits is less than a first bit count of the multiple first soft bits; reading multiple compressed channel values from the volatile memory for performing low-density parity-check (LDPC) code decoding, wherein the multiple compressed channel values correspond to the multiple channel values, respectively; and utilizing an LDPC code decoding engine circuit to perform the LDPC code decoding according to the multiple compressed channel values, and utilizing an error recovery circuit to perform at least one error recovery operation according to the multiple channel values, in order to generate error-free read data for being returned to the host device.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

The method and apparatus of the present invention can guarantee that the memory device can operate properly in various situations, and more particularly, can ensure correctness of data reading. Although downgraded flash memory dies have unstable characteristics, the method and apparatus of the present invention can perform at least one read retry operation to obtain related information for performing soft decoding, perform at least one error recovery operation to eliminate any error caused by different memory cells, and perform at least one equalization operation to reduce/cancel inter-symbol interference (ISI), in order to solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 is a diagram illustrating a work flow of a read optimization procedure of the method according to an embodiment of the present invention.

DETAILED DESCRIPTION

Figure 1:
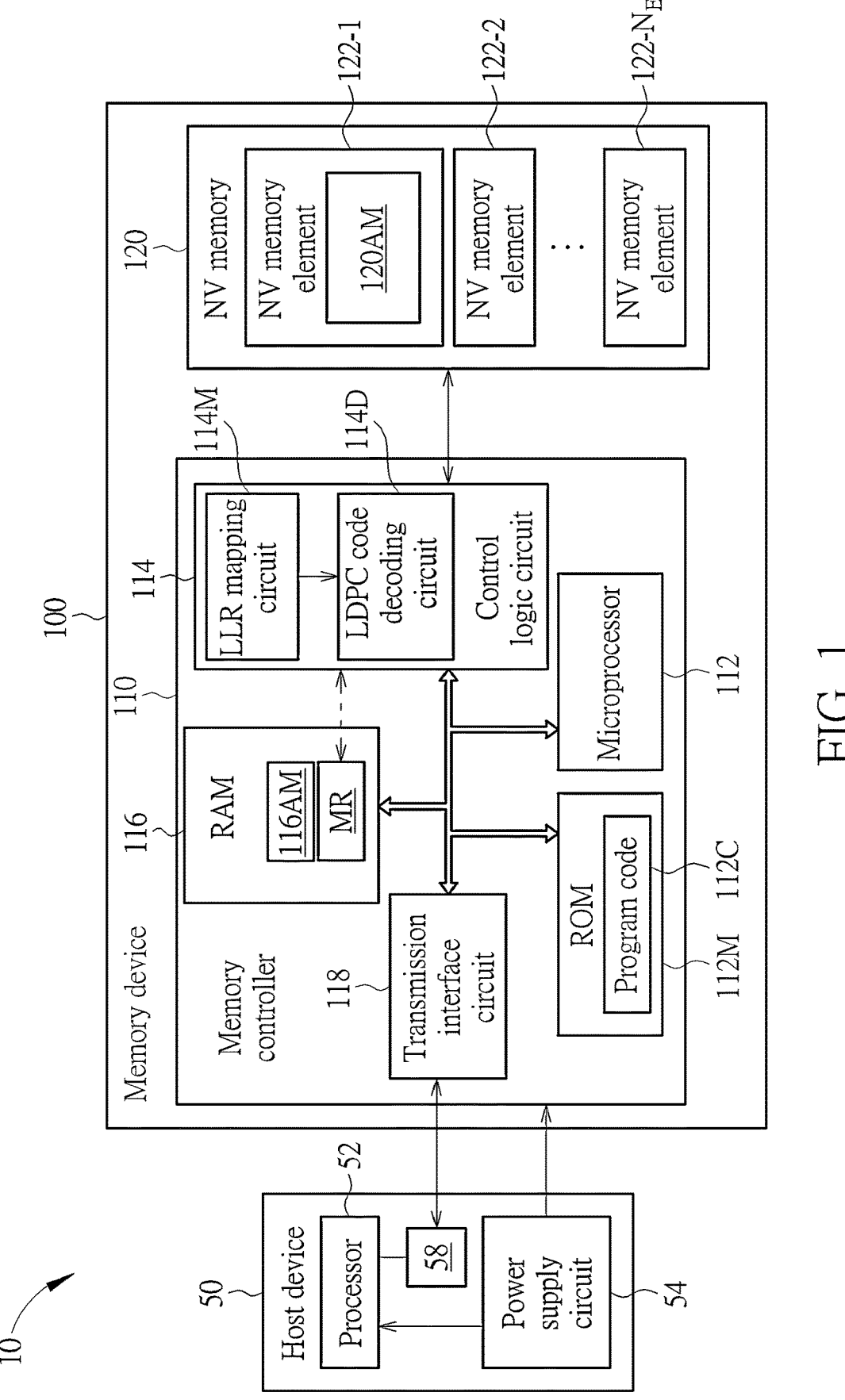
FIG. 1 is a diagram illustrating an electronic device according to an embodiment of the present invention.

FIG. 1 is a diagram illustrating an electronic device 10 according to an embodiment of the present invention, where the electronic device 10 may include a host device 50 and a memory device 100. The host device 50 may include at least one processor (e.g., one or more processors) which may be collectively referred to as the processor 52, a power supply circuit 54, and a transmission interface circuit 58, wherein the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, wherein the memory device 100 may provide the host device 50 with storage space, and may obtain the one or more driving voltages from the host device 50 to power the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or embedded multi-media card (eMMC) specification). According to this embodiment, the memory device 100 may include a controller such as a memory controller 110, and may further include a non-volatile (NV) memory 120, wherein the memory controller 110 is arranged to access the NV memory 120, and the NV memory 120 is arranged to store information. The NV memory 120 may include at least one NV memory element (e.g., one or more NV memory elements), such as a plurality of NV memory elements 122-1, 122-2, . . . , and 122-N$_E$, wherein "N$_E$" may represent a positive integer that is greater than one. For example, the NV memory 120 may be a flash memory, and the plurality of NV memory elements 122-1, 122-2, . . . , and 122-N$_E$ may be a plurality of flash memory chips or a plurality of flash memory dies, but the present invention is not limited thereto.

As shown in FIG. 1, the memory controller 110 may include a processing circuit such as a microprocessor 112, a storage unit such as a read only memory (ROM) 112M, a control logic circuit 114, a random access memory (RAM) 116, and a transmission interface circuit 118, wherein at least one portion (e.g., a portion or all) of the above components may be coupled to one another via a bus. The RAM 116 may be arranged to provide the memory controller 110 with internal storage space (for example, may temporarily store information), wherein the RAM 116 may be implemented by way of static random access memory (SRAM), but the present invention is not limited thereto. In addition, the ROM 112M of this embodiment is arranged to store a program code 112C, and the microprocessor 112 is arranged to execute the program code 112C to control the access of the NV memory 120. Note that the program code 112C may also be stored in the RAM 116 or any type of memory. Additionally, the control logic circuit 114 may be arranged to control the NV memory 120. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50.

In this embodiment, the host device 50 may transmit a plurality of host commands and corresponding logical addresses to the memory controller 110, to indirectly access the NV memory 120 within the memory device 100. The memory controller 110 receives the plurality of host commands and the logical addresses, and respectively translates the plurality of host commands into memory operating commands (which may be referred to as operating commands for brevity), and further controls the NV memory 120 with the operating commands to perform reading or writing/programing upon the memory units or data pages of specific physical addresses within the NV memory 120, wherein the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120AM for the memory controller 110 to control the memory device 100 to access data in the NV memory 120, but the present invention is not limited thereto. For better comprehension, the global L2P address mapping table 120AM may be located in a predetermined region within the NV memory element 122-1, such as a system region, but the present invention is not limited thereto. For example, the global L2P address mapping table 120AM may be divided into a plurality of local L2P address mapping tables, and the plurality of local L2P address mapping tables may be stored in one or more of the NV memory elements 122-1, 122-2, . . . , and 122-N$_E$, and more particularly, may be stored in the NV memory elements 122-1, 122-2, . . . , and 122-N$_E$, respectively. When there is a need, the memory controller 110 may load at least one portion (e.g., a portion or all) of the global L2P address mapping table 120AM into the RAM 116 or other memories. For example, the memory controller 110 may load a local L2P address mapping table among the plurality of local L2P address mapping tables into the RAM 116 to be a temporary L2P address mapping table 116AM, so that data can be accessed in the NV memory 120 according to the local L2P address mapping table stored as the temporary L2P address mapping table 116AM, but the present invention is not limited thereto.

In addition, the aforementioned at least one NV memory element (e.g., the one or more NV memory elements such as {122-1, 122-2, . . . , 122-N$_E$}) may include a plurality of blocks {BLK}, wherein the minimum unit that the memory controller 110 may perform operations of erasing data upon the NV memory 120 may be a block, and the minimum unit that the memory controller 110 may perform operations of writing data upon the NV memory 120 may be a page, but the present invention is not limited thereto. For example, any NV memory element 122-n$_E$ (where "n$_E$" may represent any integer in the interval [1, N$_E$]) within the NV memory elements 122-1, 122-2, . . . , and 122-N$_E$ may include multiple blocks, and a block among the multiple blocks may include and record a specific number of pages, wherein the memory controller 110 may access a certain page of a certain block among the multiple blocks according to a block address and a page address.

According to some embodiments, the control logic circuit 114 may include a randomization circuit and an error correction code (ECC) circuit (not shown in FIG. 1), wherein the randomization circuit may perform randomization upon the write data (e.g., the data to be written into the NV memory 120, during performing writing/programming upon the NV memory 120 in response to a write command from the host device 50) and perform de-randomization upon the read data (e.g., the data read from the NV memory 120 during performing reading upon the NV memory 120 in response to a read command from the host device 50), and the ECC circuit may perform ECC encoding upon the write data and perform ECC decoding upon the read data, in order to protect data and/or perform error correction, but the present invention is not limited thereto. For example, the NV memory elements 122-1, 122-2, . . . , and 122-N$_E$ may be implemented by downgraded flash memory dies. Under this situation, the ECC decoding may not be successful, and more particularly, uncorrectable ECC (UECC) errors may occur. The memory controller 110 may be equipped with a more robust read mechanism to avoid the high error rates caused by using the downgraded flash memory dies.

The control logic circuit 114 may include multiple read processing sub-circuits for providing the above-mentioned more robust read mechanism, and the multiple read processing sub-circuits may include a log-likelihood ratio (LLR) mapping circuit 114M and a low-density parity-check (LDPC) code decoding circuit 114D, wherein the LLR mapping circuit 114M may perform related mapping operations upon read data buffered in at least one memory region MR, in order to allow the LDPC code decoding circuit 114D to perform related decoding operations for obtaining error-free data to be returned to the host device 50, but the present invention is not limited thereto. According to some embodiments, the architecture shown in FIG. 1 may vary. For example, at least one portion (e.g., a portion or all) of the multiple read processing sub-circuits (e.g., the LLR mapping circuit 114M and the LDPC code decoding circuit 114D) may be integrated into at least one other circuit (rather than the control logic circuit 114). In addition, when a reading operation is performed upon the NV memory 120 in response to a read command from the host device 50, the memory controller 110 may obtain multiple channel values {CV} from the NV memory 120 through at least one channel CH (e.g., one or more channels {CH}, such as multiple channels {CH(i)}), in order for the multiple read processing sub-circuits to perform related processing and thereby obtain error-free data.

Figure 2:
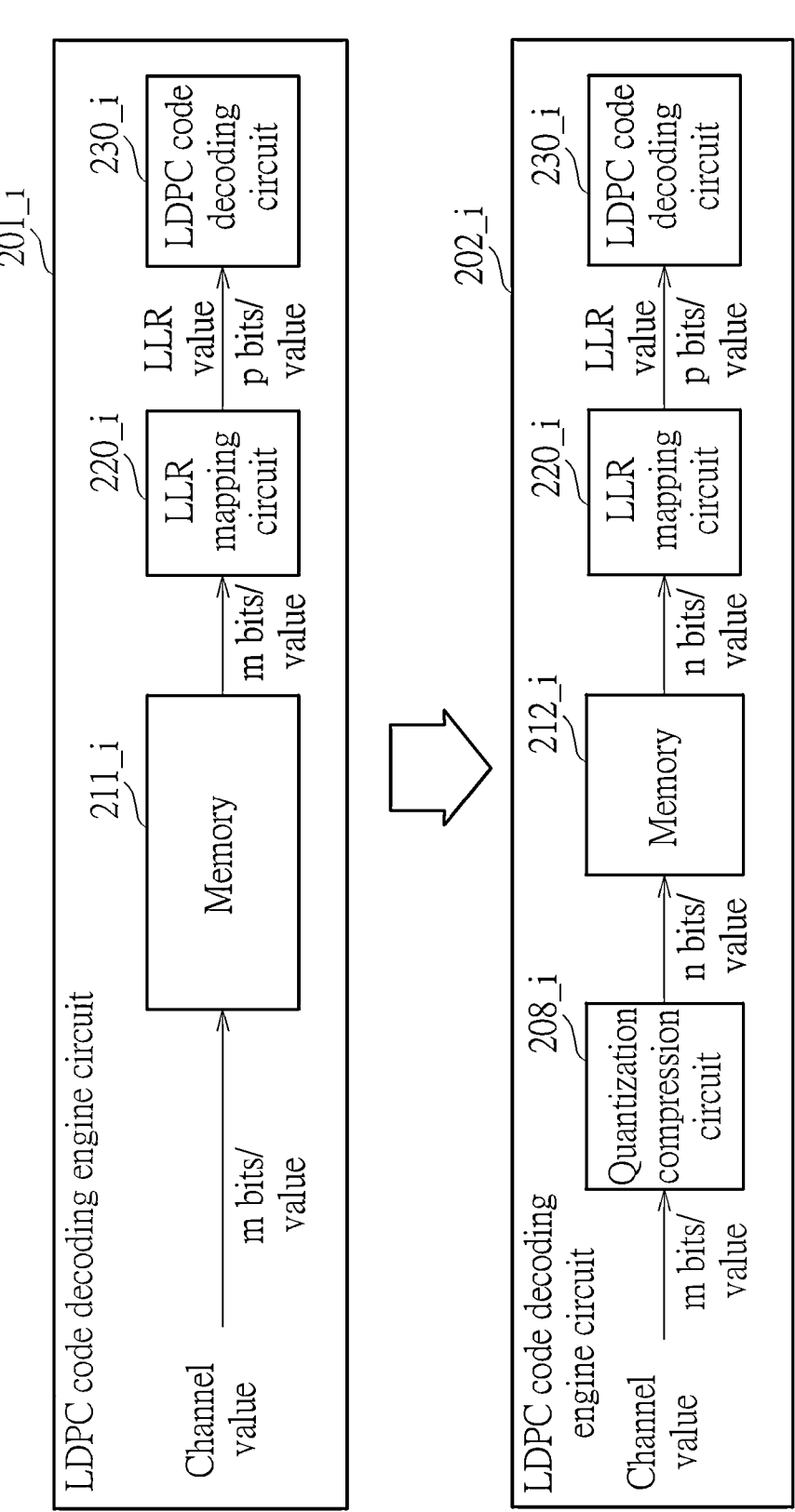
FIG. 2 is a diagram illustrating multiple LDPC code decoding control schemes according to some embodiments of the present invention.

FIG. 2 is a diagram illustrating multiple LDPC code decoding control schemes according to some embodiments of the present invention, wherein the multiple LDPC code decoding control schemes include a first LDPC code decoding control scheme and a second LDPC code decoding control scheme. Based on the first LDPC code decoding control scheme shown in the upper half of FIG. 2, the multiple read processing sub-circuits within the memory controller 110 may include at least one LDPC code decoding engine circuit 201_$i$ corresponding to the at least one channel CH, and more particularly, may include multiple LDPC code decoding engine circuits {201_$i$} that respectively correspond to the channels {CH(i)}, such as I LDPC code decoding engine circuits {201_$i$|i=1, . . . , I} that respectively correspond to I channels {CH(i)|i=1, . . . , I} (e.g., "I" may be any positive integer greater than one). For example, any LDPC code decoding engine circuit 201_$i$ among the LDPC code decoding engine circuits {201_$i$} may include a volatile memory (e.g., a memory 211_$i$), an LLR mapping circuit 220_$i$, and an LDPC code decoding circuit 230_$i$, and may be coupled to the NV memory 120 to obtain a set of channel values {CV} with m bits per value (labeled as "m bits/value" in FIG. 2 for brevity) from the NV memory 120 through a corresponding channel CH(i), for performing related processing. Any channel value CV among the set of channels {CV} may include a sign bit and multiple first soft bits (e.g., (m−1) first soft bits).

The memory controller 110 may perform at least one reading operation upon the NV memory 120 through the channel CH(i) to obtain the set of channel values {CV} for being buffered in the volatile memory (e.g., the memory 211_$i$). In addition, the memory controller 110 may utilize the LLR mapping circuit 220_$i$ to read the set of channel values {CV} from the memory 211_$i$, perform an LLR mapping operation upon the set of channel values {CV} to generate a set of LLR values with p bits per value (labeled as "p bits/value" in FIG. 2 for brevity), and utilize the LDPC code decoding circuit 230_$i$ to perform at least one LDPC code decoding operation according to the set of LLR values, in order to generate error-free read data for being returned to the host device 50. For example, the NV memory elements 122-1, 122-2, . . . , and 122-$N_E$ may be implemented by downgraded flash memory dies. The memory controller 110 may perform a read retry procedure to obtain soft information (e.g., soft bits that are respectively carried by the set of channel values {CV}) for performing soft decoding (e.g., LDPC code decoding), in order to avoid high error rates caused by the downgraded flash memory dies.

Based on the second LDPC code decoding control scheme shown in the lower half of FIG. 2, the multiple read processing sub-circuits within the memory controller 110 may include at least one LDPC code decoding engine circuit 202_$i$ corresponding to the at least one channel CH, and more particularly, may include multiple LDPC code decoding engine circuits {202_$i$} that respectively correspond to the channels {CH(i)}, such as I LDPC code decoding engine circuits {202_$i$|i=1, . . . , I} that respectively correspond to I channels {CH(i)|i=1, . . . , I}. For example, any LDPC code decoding engine circuit 202_$i$ among the LDPC code decoding engine circuits {202_$i$} may include a compression circuit (e.g., a quantization compression circuit 208_$i$), a volatile memory (e.g., a memory 212_$i$), the LLR mapping circuit 220_$i$, and the LDPC code decoding circuit 230_$i$, and may be coupled to the NV memory 120 to obtain a set of channel values {CV} with m bits per value (labeled as "m bits/value" in FIG. 2 for brevity, such as the same set of channel values {CV} mentioned in the first LDPC code decoding control scheme) from the NV memory 120 through the corresponding channel CH(i), for performing related processing, but the present invention is not limited thereto.

The memory controller 110 may perform at least one reading operation upon the NV memory 120 through the channel CH(i) to obtain the set of channel values {CV}, utilize the quantization compression circuit 208_$i$ to perform at least one compression operation upon the set of channel values {CV} for converting multiple first soft bits of any channel value CV among the set of channel values {CV} into multiple second soft bits, in order to generate a compressed channel value $CV_{COMPRESSED}$ corresponding to the channel value CV, the compressed channel value $CV_{COMPRESSED}$ for being buffered in the volatile memory (e.g., the memory 212_$i$), wherein the channel value CV includes a sign bit and the multiple first soft bits (e.g., (m−1) first soft bits), and the compressed channel value $CV_{COMPRESSED}$ may include the sign bit and the multiple second soft bits (e.g., (n−1) second soft bits), and a bit count of the multiple second soft bits (e.g., a soft bit count (n−1)) is less than that of the multiple first soft bits (e.g., a soft bit count (m−1)). As a result, the memory 212_$i$ may have already buffered a set of compressed channel values {$CV_{COMPRESSED}$} with n bits per value (labeled as "n bits/value" in FIG. 2 for brevity) from the quantization compression circuit 208_$i$. In addition, the memory controller 110 may utilize the LLR mapping circuit 220_$i$ to read the set of compressed channel values {$CV_{COMPRESSED}$} that respectively correspond to the set of channel values {CV} from the memory 212_$i$, perform LLR mapping operations upon the set of compressed channel values {$CV_{COMPRESSED}$} to generate a set of LLR values with p bits per value (labeled as "p bits/value" in FIG. 2 for brevity), and utilize the LDPC code decoding circuit 230_$i$ to perform at least one LDPC code decoding operation according to the set of LLR values, in order to generate error-free read data for being returned to the host device 50. For example, the NV memory elements 122-1, 122-2, . . . , and 122-$N_E$ may be implemented by downgraded flash memory dies. The memory controller 110 may perform the read retry procedure to obtain the soft information (e.g., soft bits that are respectively carried by the set of channel values {CV}), and more particularly, may compress the soft information to generate compressed soft information (e.g. soft bits that are respectively carried by the set of compressed channel values {$CV_{COMPRESSED}$}) for performing soft decoding (e.g., LDPC code decoding), in order to avoid high error rates caused by the downgraded flash memory dies.

Compared with the first LDPC code decoding control scheme, the second LDPC code decoding control scheme can save the memory space, and more particularly, a ratio of a size of the total memory space of the memories {212_$i$|i=1, ..., I} to a size of the total memory space of the memories {211_$i$|i=1, ..., I} can be equal to (n/m), no matter whether the memories {211_$i$|i=1, ..., I} and the memories {212_$i$|i=1, ..., I} are implemented by the at least one memory region MR (e.g., one or more memory regions {MR}, such as I memory regions {MR(i)|i=1, ..., I}) or dedicated memories (e.g., other RAMs). For example, when m=6 and n=3, the ratio (n/m) may be (1/2), but the present invention is not limited thereto. In some examples, the bit count m, the bit count n, and/or the ratio (n/m) may vary. According to some embodiments, any LLR value among the above mentioned LLR values may be represented as follows:

$$LLR_{\{B'\}} = \ln(L(\theta_0 \mid x)/L(\theta_1 \mid x)); \qquad \text{Eq (1)}$$

wherein "L( )" may represent a probability function, "L($\theta_0$|x)" may represent a probability of the sign bit being equal to 0, "L($\theta_1$|x)" may represent a probability of the sign bit being equal to 1, and "LLR$_{\{B'\}}$" may represent the LLR value (e.g., the LLR value when the soft bits are equal to a set of soft bits {B'} such as bits {B1', ..., B(n−1)'}), but the present invention is not limited thereto.

According to some embodiments, the memory controller 110 may receive the plurality of host commands from the host device 50 through the transmission interface circuit 118 within the memory controller 110, for performing data access upon the NV memory 120 according to the plurality of host commands, wherein the data access may include data reading. In addition, in response to at least one read command among the plurality of host commands, the memory controller 110 may perform a read optimization procedure for maintaining correctness of the data reading. For example, the read optimization procedure may include the above-mentioned operations of the LDPC code decoding engine circuit 201_$i$, and more particularly, may include similar operations of the I LDPC code decoding engine circuits {201_$i$|i=1, ..., I}. In another example, the read optimization procedure may include the above-mentioned operations of the LDPC code decoding engine circuit 202_$i$, and more particularly, may include similar operations of the I LDPC code decoding engine circuits {202_$i$|i=1, ..., I}.

Figure 3:
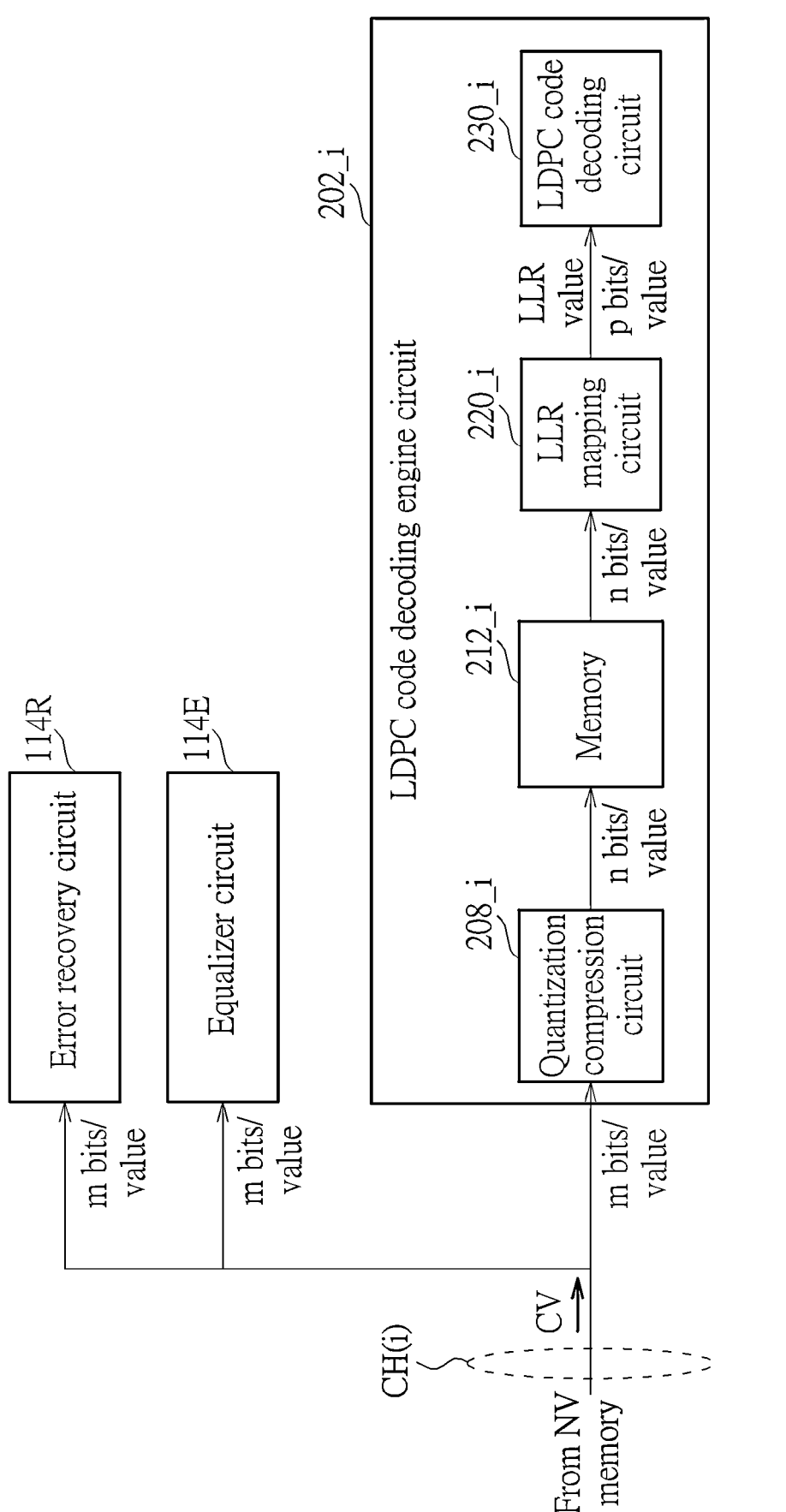
FIG. 3 is a diagram illustrating a channel value processing control scheme of a method for performing data access control of a memory device according to an embodiment of the present invention.

FIG. 3 is a diagram illustrating a channel value processing control scheme of a method for performing data access control of a memory device (e.g., the memory device 100 shown in FIG. 1) according to an embodiment of the present invention. The multiple read processing sub-circuits within the memory controller 110 may include the at least one LDPC code decoding engine circuit 202_$i$ corresponding to the at least one channel CH (e.g., the I LDPC code decoding engine circuits {202_$i$|i=1, ..., I} that respectively correspond to the I channels {CH(i)|i=1, ..., I}), and may further include an error recovery circuit 114R and an equalizer circuit 114E. For example, the error recovery circuit 114R and the equalizer circuit 114E may be located in the control logic circuit 114 shown in FIG. 1, I LLR mapping circuits {220_$i$|i=1, ..., I} that respectively correspond to the I channels {CH(i)|i=1, ..., I} may be regarded as multiple sub-circuits of the LLR mapping circuit 114M shown in FIG. 1, and I LDPC code decoding circuits {230_$i$| i=1, ..., I} that respectively correspond to the I channels {CH(i)|i=1, ..., I} may be regarded as multiple sub-circuits of the LDPC code decoding circuit 114D shown in FIG. 1, but the present invention is not limited thereto. According to some embodiments, at least one portion (e.g., a portion or all) of the multiple read processing sub-circuits, such as the I LDPC code decoding engine circuits {202_$i$|i=1, ..., I}, the error recovery circuit 114R, and the equalizer circuit 114E, may be integrated into the at least one other circuits (rather than the control logic circuit 114).

For better comprehension, assume that any block BLK among the plurality of blocks {BLK} of the NV memory 120 may be configured as a J-level cell block, wherein "J" may represent a positive integer. For example, when J=1, the block BLK may be a single-level cell (SLC) block; and when J>1, the block BLK may be a multiple/multi-level cell (MLC) block, wherein if J=2, the block BLK may be a double-level cell (DLC); if J=3, the block BLK may be a triple-level cell (TLC) block; if J=4, the block BLK may be a quadruple-level cell (QLC) block; and the rest may be deduced by analogy, but the present invention is not limited to. Based on the channel value processing control scheme, the read optimization procedure may include related operations of the multiple read processing sub-circuits (e.g. the architecture shown in FIG. 3), and more particularly, may include the following operations:

(1) the memory controller 110 may perform at least one reading operation upon the NV memory 120 through at least one channel CH(i) among the multiple channels {CH(i)}, in order to obtain multiple channel values {CV}, wherein any channel value CV among the multiple channel values {CV} may include a sign bit Sign bit (j) and (m−1) soft bits {Soft_bit_org(j, k)| k=1, ..., (m−1)}, "j" may represent an integer within an interval [0, (J−1)], and "k" may represent an integer within an interval [1, (m−1)];

(2) the memory controller 110 may utilize the quantization compression circuit 208_$i$ to perform at least one compression operation upon the multiple channel values {CV} to convert the (m−1) soft bits {Soft_bit_org (j, k)|k=1, ..., (m−1)} of the channel value CV into (n−1) soft bits {Soft_bit_new(j, k)|k=1, ..., (n−1)}, in order to generate a compressed channel value CV$_{COMPRESSED}$ corresponding to the channel value CV, the compressed channel value CV$_{COMPRESSED}$ for being buffered in the volatile memory (e.g., the memory 212_$i$), wherein a bit count of the (n−1) soft bits {Soft_bit_new(j, k)|k=1, ..., (n−1)} (e.g., the bit count (n−1)) is less than that of the (m−1) soft bits {Soft_bit_org(j, k)|k=1, ..., (m−1)} (e.g., the bit count (m−1));

(3) the memory controller 110 may utilize the LLR mapping circuit 220_$i$ to read multiple compressed channel values {CV$_{COMPRESSED}$} that respectively correspond to the multiple channel values {CV} from the volatile memory (e.g., the memory 212_$i$), and perform LLR mapping operations upon the multiple compressed channel values {CV$_{COMPRESSED}$} to generate multiple LLR values; and (4) the memory controller 110 may utilize the LDPC code decoding circuit 230_$i$ to perform at least one LDPC code decoding operation according to the multiple LLR values, utilize the error recovery circuit 114R to perform at least one error recovery operation according to the multiple channel values {CV}, and further utilize the equalizer circuit 114E to perform at least one equalization operation according to the multiple channel values {CV}, in order to generate error-free read data for being returned to the host device 50, wherein the equalizer circuit 114E may represent a decision feedback equalizer circuit, and the at least one equalization operation may represent at least one decision feedback equalization (DFE) operation;

but the present invention is not limited thereto. According to some embodiments, the operations of the read optimization procedure may vary. In addition, the at least one reading operation may include a first reading operation and multiple read retry operations regarding the first reading operation, wherein the sign bit Sign bit (j) of the channel value CV may be obtained from the first reading operation, and the (m−1) soft bits {Soft_bit_org(j, k)|k=1, . . . , (m−1)} of the channel value CV may be obtained from the multiple read retry operations.

An associated apparatus operating according to the method (e.g., the memory controller 110, the memory device 100, and the electronic device 10) can ensure correctness of read data, and based on the read optimization procedure including the at least one LDPC code decoding operation, the at least one error recovery operation, and the at least one equalization operation, the error-free read data may not have any error. For example, the NV memory elements 122-1, 122-2, . . . , and 122-N$_E$ may be implemented by downgraded flash memory dies. Under this situation, although downgraded flash memory dies have unstable characteristics, the associated apparatus operating according to the method can perform read retry to obtain soft information for performing soft decoding, perform error recovery to eliminate any error caused by different memory cells, and perform equalization to reduce/cancel inter-symbol interference (ISI), in order to solve the related art problems without introducing any side effect or in a way that is less likely to introduce a side effect. In addition, the associated apparatus operating according to the method may achieve optimal configuration, without being limited by a trade-off between different considerations. For example, the different considerations may include:

(1) a first consideration: whether to adopt downgraded flash memory dies;

(2) a second consideration: whether to be able to maintain correctness of read data;

(3) a third consideration: whether to adopt a soft decoding mechanism; and (4) a fourth consideration: whether to configure more memory space for performing soft decoding;

wherein the associated apparatus operating according to the method may directly adopt downgraded flash memory dies in order to reduce the overall costs, without being limited by a trade-off between the first consideration and the second consideration, and more particularly, may obtain soft information through the rad retry procedure for performing soft decoding, and further perform the error recovery to eliminate adverse effects between memory cells in various directions and perform the equalization (e.g., the DFE) to reduce/cancel the ISI. In this way, under a condition that the downgraded flash memory dies are adopted to reduce the overall costs, the chance of successful reading during daily use by users can be improved, the quantization compression may be performed to significantly reduce the memory space required for soft decoding, and the soft decoding may be performed efficiently, without being limited to a trade-off between the third consideration and the fourth consideration.

Figure 4A:
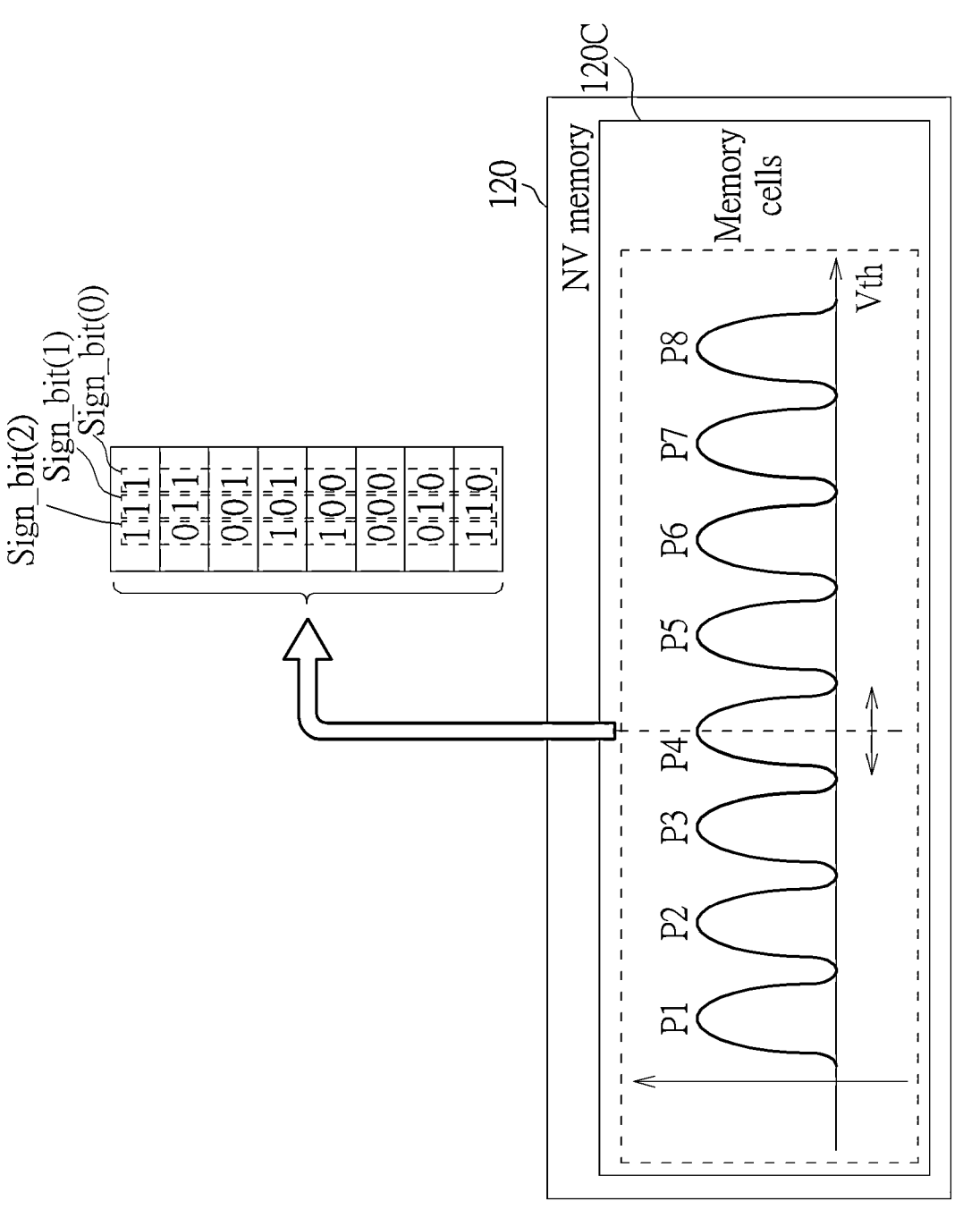
FIG. 4A is a diagram illustrating multiple sign bits involved in the method according to an embodiment of the present invention.

FIG. 4A is a diagram illustrating multiple sign bits Sign_bit(0), Sign_bit(1), and Sign_bit(2) involved in the method according to an embodiment of the present invention. A set of memory cells 120C within the NV memory 120 may be configured as J-level cells, and any memory cell among the set of memory cells 120C may be in a programming state P selected from multiple candidate programming states {P} (e.g., $2^J$ programming states {P1, . . . , P2$^J$}). For example, when J=3, the set of memory cells 120C may be configured as triple-level cells, and any memory cell among the set of memory cells 120C may be in a programming state P selected from the multiple candidate programming states {P} (e.g., 8 programming states {P1, . . . , P8}), wherein the horizontal axis shown in the lower half of FIG. 4A may represent a threshold value Vth, and the threshold value Vth may be referred to as a read voltage according to some embodiments, but the present invention is not limited thereto. According to some embodiments, the multiple candidate programming states {P1, . . . , P8} and/or a level count J of the set of memory cells 120C may vary. For example, the level count J may be equal to any value among a series of values {1, 2, 3, 4, . . . }.

As shown in the upper half of FIG. 4A, the memory controller 110 may refer to a predetermined encoding rule to associate the $2^J$ programming states {P1, . . . , P2$^J$} (e.g., the 8 programming states {P1, . . . , P8}) with $2^J$ predetermined codes (e.g., 8 predetermined codes {111, 011, 001, 101, 100, 000, 010, 110}), wherein any predetermined code among the $2^J$ predetermined codes may include J sign bits {Sign_bit (j)|j=0, . . . , (J−1)} (e.g., 3 sign bits Sign_bit(0), Sign_bit(1), and Sign_bit(2)), but the present invention is not limited thereto. According to some embodiments, the predetermined encoding rule, the $2^J$ predetermined codes (e.g., the 8 predetermined codes {111, 011, 001, 101, 100, 000, 010, 110} shown in FIG. 4A), and/or the level count J may vary.

Figures 4B, 5A:
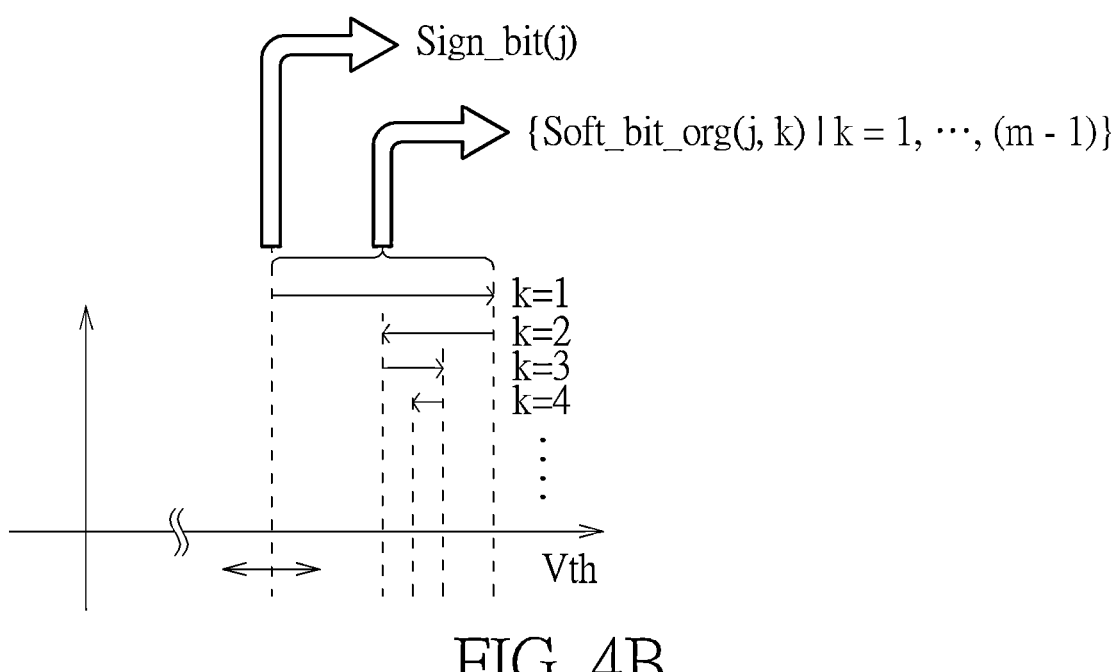
FIG. 4B is a diagram illustrating a sign bit and multiple soft bits involved in the method according to an embodiment of the present invention.
FIG. 5A is a diagram illustrating a compression processing control scheme of the method according to an embodiment of the present invention.

FIG. 4B is a diagram illustrating the sign bit Sign_bit(j) and the (m−1) soft bits {Soft_bit_org(j, k)|k=1, . . . , (m−1)} involved in the method according to an embodiment of the present invention. During the read optimization procedure, the memory controller 110 may perform the first reading operation to obtain the sign bit Sign_bit(j), and further execute the read retry procedure to perform the multiple read retry operations, in order to obtain the (m−1) soft bits {Soft_bit_org(j, k)|k=1, . . . , (m−1)}, wherein the (m−1) soft bits {Soft_bit_org(j, k)|k=1, . . . , (m−1)} may indicate how strong bit 1 or weak bit 1 the sign bit Sign_bit(j) is (if Sign_bit(j)=1), or may indicate how strong bit 0 or weak bit 0 the sign bit Sign_bit(j) is (if Sign_bit(j)=0); and according to some embodiments, the (m−1) soft bits {Soft_bit_org(j, k)|k=1, . . . , (m−1)} may be arranged to accurately indicate a position of the programming state P associated with the sign bit Sign_bit(j) on the Vth axis, in order to improve the accuracy of detecting the position of the programming state P on the Vth axis, but the present invention is not limited thereto. For example, when k=1, the memory controller 110 may perform the 1$^{st}$ read retry operation to obtain the 1$^{st}$ soft bit Soft_bit_org(j, 1); when k=2, the memory controller 110 may perform the 2$^{nd}$ read retry operation to obtain the 2$^{nd}$ soft bit Soft_bit_org(j, 2); when k=3, the memory controller 110 may perform the 3$^{rd}$ read retry operation to obtain the 3$^{rd}$ soft bit Soft_bit_org(j, 3); when k=4, the memory controller 110 may perform the 4$^{nd}$ read retry operation to obtain the 4$^{nd}$ soft bit Soft_bit_org(j, 4); and the rest may be deduced by analogy.

For better comprehension, arrows respectively corresponding to k=1, k=2, k=3, k=4, etc. may be drawn in FIG. 4B to indicate related operations of detecting the position of the programming state P on the Vth axis, but the present invention is not limited thereto. According to some embodiments, these operations, related detection directions on the Vth axis (e.g., positive directions or negative directions), and/or related detection positions on the Vth axis may vary.

FIG. 5A is a diagram illustrating a compression processing control scheme of the method according to an embodiment of the present invention. For example, assuming that m=6, in the channel value CV input to the quantization compression circuit 208_i, the sign bit Sign_bit(j) may include a bit B0, and the (m−1) soft bits {Soft_bit_org(j, k)lk=1, . . . , (m−1)} may include 5 bits B1, B2, B3, B4, and B5 (e.g., any binary value among multiple binary values {00000, 00001, . . . , 11111}); and assuming that n=3, in the compressed channel value $CV_{COMPRESSED}$ output from the quantization compression circuit 208_i, the sign bit Sign_bit (j) may include the same bit B0, and the (n−1) soft bits {Soft_bit_new(j, k)lk=1, . . . , (n−1)} may include 2 bits B1' and B2' (e.g., any binary value among multiple binary values {00, 01, 10, 11}), but the present invention is not limited thereto. According to some embodiments, the soft bit count (m−1), the soft bits count (n−1), and/or related bit arrangement may vary.

When n=3, the set of soft bits {B'} (e.g., bits {B1', . . . , B(n−1)'}) may represent bits {B1', B2'} (e.g., any binary value among multiple binary values {00, 01, 10, 11}), and the equation Eq(1) may be rewritten as follows:

$$LLR_{\{B1',B2'\}} = \ln(L(\theta_0 \mid x)/L(\theta_1 \mid x));\qquad \text{Eq (2)}$$

wherein "$LLR_{\{B1',\,B2'\}}$" may represent an LLR value when the soft bits are equal to the bits {B1, B2'}.

Figure 5B:
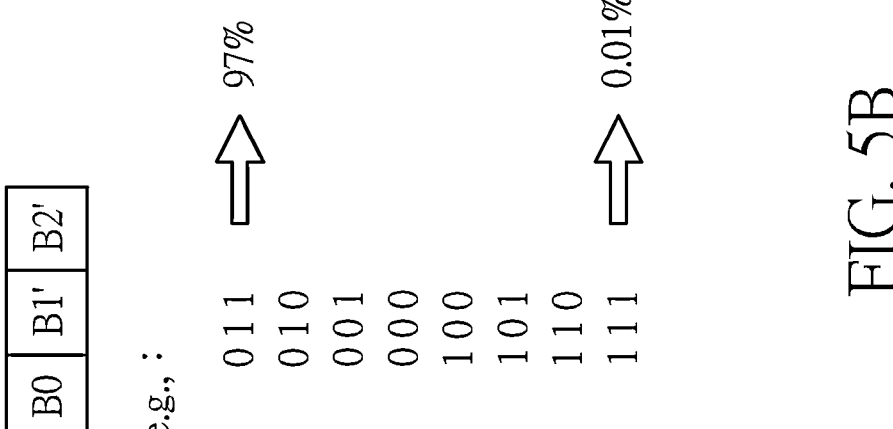
FIG. 5B is a diagram illustrating some related probabilities and multiple sets of candidate bits of the bits shown in the lower half of FIG. 5A according to an embodiment of the present invention.

FIG. 5B is a diagram illustrating some related probabilities and multiple sets of candidate bits of the bits {B0, B1', B2'} shown in the lower half of FIG. 5A according to an embodiment of the present invention. For example, the bits {B0, B1', B2'} may be equal to any set of bits among 8 sets of candidate bits {011, 010, 001, 000, 100, 101, 110, 111}, when a probability of {B0, B1', B2'}=011 may be 97%, and a probability of {B0, B1', B2'}=111 may be 0.01%, but the present invention is not limited thereto. According to some embodiments, the bit count (n−1) of the bits {B1', . . . , B(n−1)'}, the corresponding 2n sets of candidate bits, and/or related probabilities may vary. In addition, regarding {B1', B2'}=11, the equation Eq(2) may be rewritten as follows:

$$LLR_{11} = \ln(97\%/0.01\%);$$

but the present invention is not limited thereto. In some examples, the LLR value $LLR_{11}$ may correspondingly vary with the related probabilities.

Figure 6:
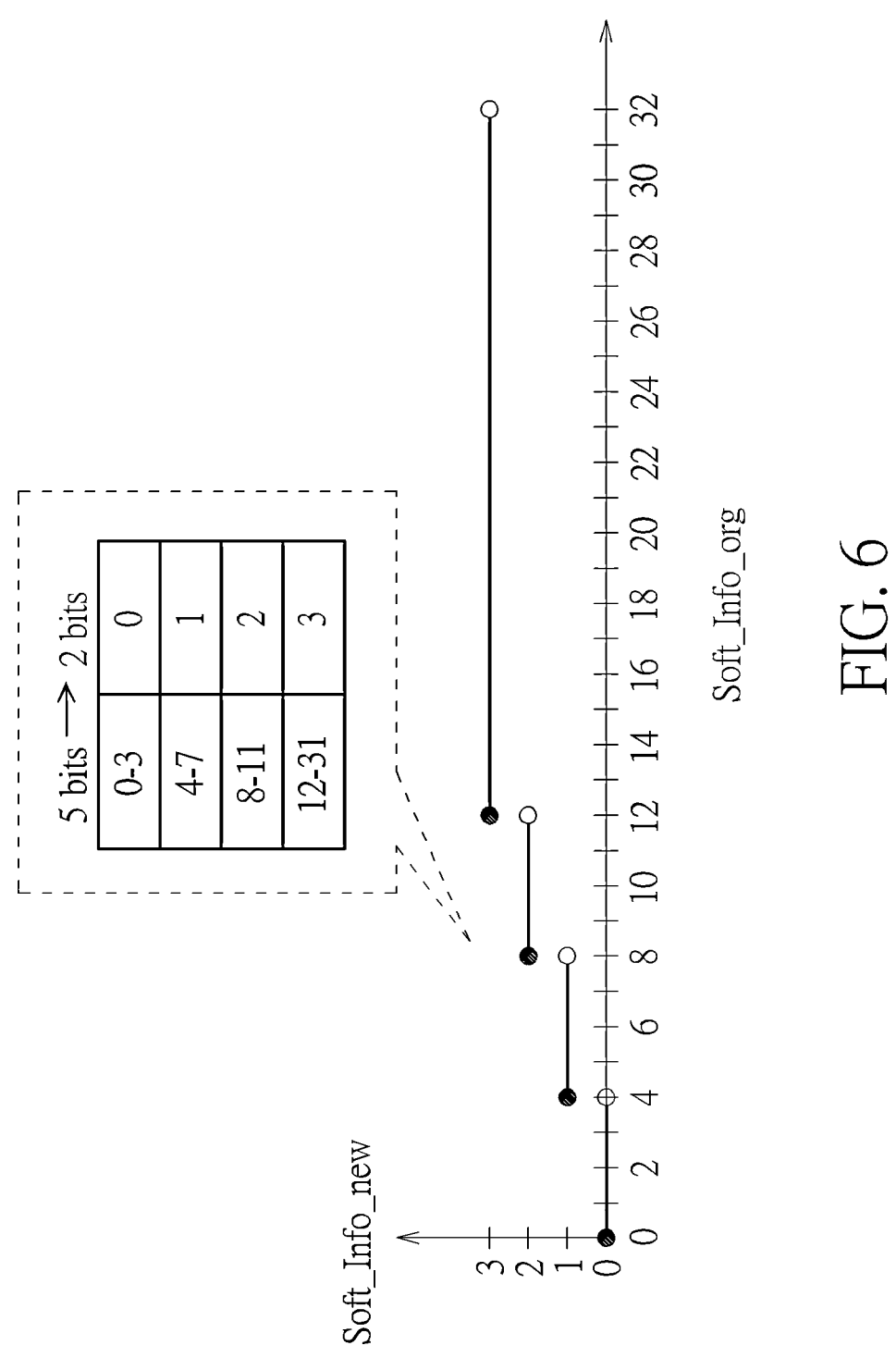
FIG. 6 is a diagram illustrating a compression mapping function involved in the compression processing control scheme of the method according to an embodiment of the present invention.

FIG. 6 is a diagram illustrating a compression mapping function involved in the compression processing control scheme of the method according to an embodiment of the present invention, wherein the horizontal axis may represent original soft information Soft_Info_org (e.g., decimal values of the (m−1) soft bits {Soft_bit_org(j, k)lk=1, . . . , (m−1)}), and the vertical axis may represent new soft information Soft Info new (e.g., decimal values of the (n−1) soft bits {Soft_bit_new(j, k)lk=1, . . . , (n−1)}). The memory controller 110 may utilize the quantization compression circuit 208_i to compress the (m−1) soft bits {Soft_bit_org(j, k)lk=1, . . . , (m−1)} according to the compression mapping function, in order to generate the (n−1) soft bits {Soft_ bit_new(j, k)lk=1, . . . , (n−1)} in the compressed channel value $CV_{COMPRESSED}$. For example, assuming that m=6 and n=3, the memory controller 110 may utilize the quantization compression circuit 208_i to compress the (m−1) soft bits {Soft_bit_org(j, k)lk=1, . . . , (m−1)} (e.g., the 5 bits B1, B2, B3, B4, and B5 shown in the upper half of FIG. 5A) according to the compression mapping function, in order to generate the (n−1) soft bits {Soft_bit_new(j, k)lk=1, . . . , (n−1)} (e.g., the 2 bits B1' and B2' shown in the lower half of FIG. 5A), and more particularly, may map the decimal values of the 5 bits B1, B2, B3, B4, and B5 from any sub-mapping range among multiple sub-mapping ranges (e.g., respective ranges of intervals [0, 3], [4, 7], [8, 11], and [12, 31]) of a mapping range (e.g. a range of an interval [0, 31]) to a corresponding mapping value among multiple mapping values (e.g., values 0, 1, 2, and 3), in order to become the 2 bits B1' and B2', but the present invention is not limited thereto. According to some embodiments, the compression mapping function, the mapping range and the multiple sub-mapping ranges thereof, the soft bit count (m−1), and/or the soft bit count (n−1) may vary.

Figure 7A:
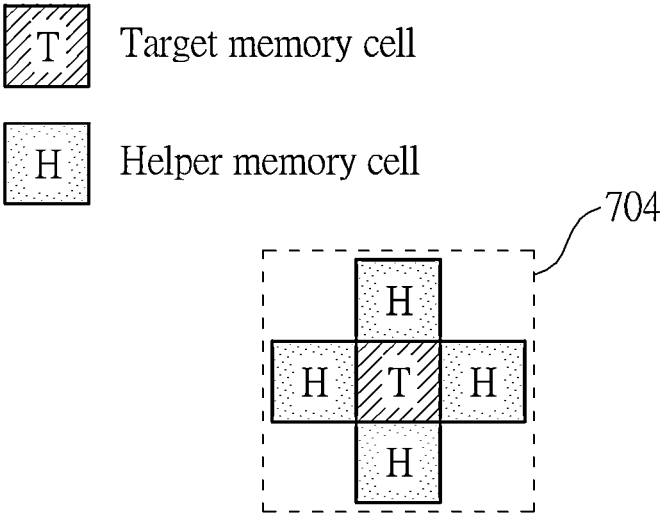
FIG. 7A is a diagram illustrating a target memory cell and multiple helper memory cells involved in the method according to an embodiment of the present invention.

FIG. 7A is a diagram illustrating a target memory cell and multiple helper memory cells involved in the method according to an embodiment of the present invention. For better comprehension, a two-dimensional (2D) flash memory is taken as an example of the NV memory 120. A set of error-recovery-related memory cells 704 may include the target memory cell and four memory cells adjacent to the target memory cell. The memory controller 110 may utilize the error recovery circuit 114R to perform the at least one error recovery operation according to the multiple channel values {CV}, in order to eliminate any error caused by the multiple helper memory cells (e.g., the four memory cells adjacent to the target memory cell), but the present invention is not limited thereto. According to some embodiments, the type of the NV memory 120, the number of helper memory cells regarding the target memory cell, and/or the arrangement of the multiple helper memory cells may vary.

Figure 7B:
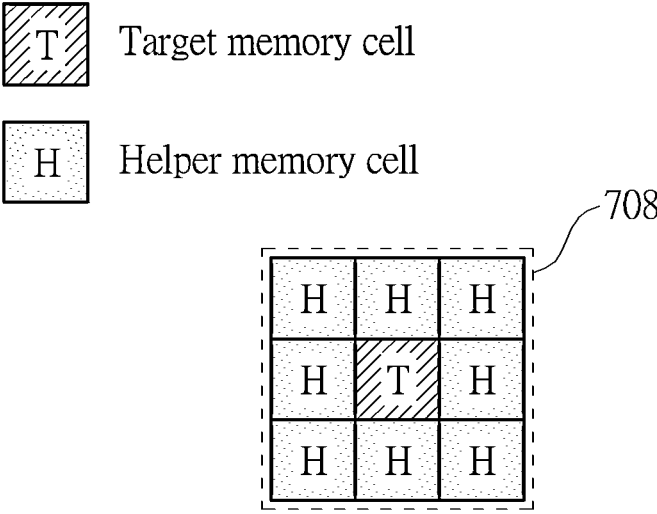
FIG. 7B is a diagram illustrating a target memory cell and multiple helper memory cells involved in the method according to another embodiment of the present invention.

FIG. 7B is a diagram illustrating a target memory cell and multiple helper memory cells involved in the method according to another embodiment of the present invention. For better comprehension, a 2D flash memory is taken as an example of the NV memory 120. A set of error-recovery-related memory cells 708 may include the target memory cell and eight memory cells surrounding the target memory cell. The memory controller 110 may utilize the error recovery circuit 114R to perform the at least one error recovery operation according to the multiple channel values {CV}, in order to eliminate any error caused by the multiple helper memory cells (e.g., the eight memory cells surrounding the target memory cell), but the present invention is not limited thereto. According to some embodiments, the type of the NV memory 120, the number of helper memory cells regarding the target memory cell, and/or the arrangement of the multiple helper memory cells may vary.

Figure 7C:
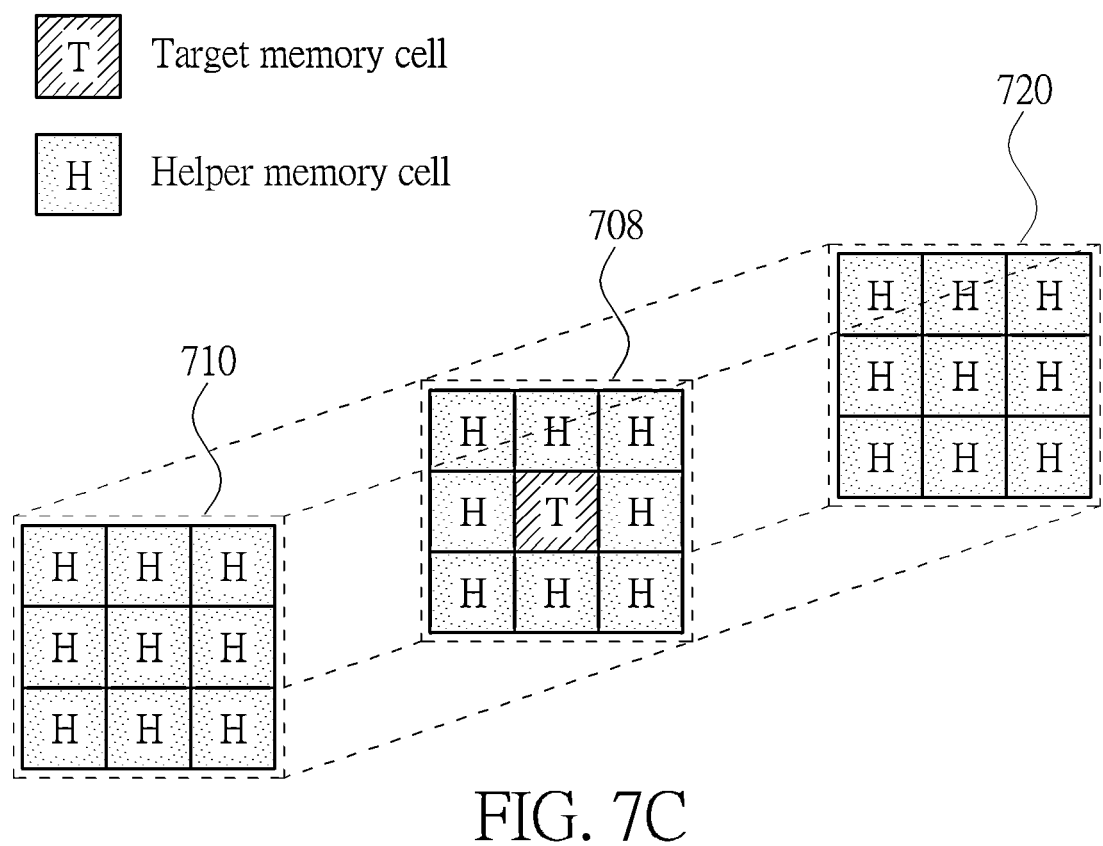
FIG. 7C is a diagram illustrating a target memory cell and multiple helper memory cells involved in the method according to still another embodiment of the present invention.

FIG. 7C is a diagram illustrating a target memory cell and multiple helper memory cells involved in the method according to still another embodiment of the present invention. For better comprehension, a 3D flash memory is taken as an example of the NV memory 120. A first set of error-recovery-related memory cells 708 may include the target memory cell and eight memory cells surrounding the target memory cell in the same layer. A second set of error-recovery-related memory cells 710 may include nine memory cells corresponding to the first set of error-recovery-related memory cells 708 in another layer (e.g., an upper layer). A third set of error-recovery-related memory cells 720 may include nine memory cells corresponding to the first set of error-recovery-related memory cells 708 in still another layer (e.g., a lower layer). In addition, the memory controller 110 may utilize the error recovery circuit 114R to perform the at least one error recovery operation according to the multiple channel values {CV}, in order to eliminate any error caused by the multiple helper memory cells (e.g., the eight memory cells surrounding the target memory cell, the nine memory cells in the another layer (e.g., the upper layer), and the nine memory cells in the still another layer (e.g., the lower layer)), but the present invention is not limited thereto. According to some embodiments, the type of the NV memory 120, the number of helper memory cells regarding the target memory cell, and/or the arrangement of the multiple helper memory cells may vary.

Figure 8A:
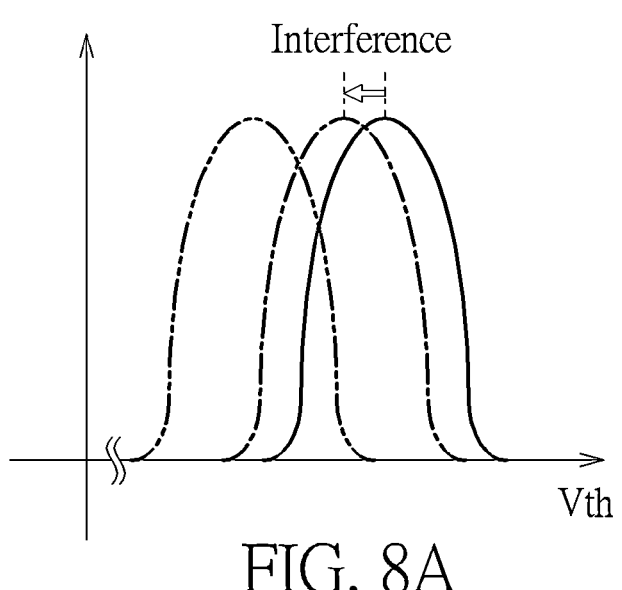
FIG. 8A is a diagram illustrating an interfered programming state of a target memory cell and a programming state of a helper memory cell involved in an error recovery control scheme of the method according to an embodiment of the present invention, wherein a non-interfered programming state of the target memory cell is also illustrated in FIG. 8A for better comprehension.

FIG. 8A is a diagram illustrating an interfered programming state of a target memory cell and a programming state of a helper memory cell #q involved in an error recovery control scheme of the method according to an embodiment of the present invention, wherein a non-interfered programming state of the target memory cell is also illustrated in FIG. 8A for better comprehension. Assume that all error-recovery-related memory cells regarding the target memory cell may include Q helper memory cells #1, #2, . . . , and #Q (e.g., "Q" may represent a positive integer), and the helper memory cell #q may be one of the Q helper memory cells #1, #2, . . . , and #Q (e.g., "q" may be an integer in an interval [1, Q]). The target memory cell and the multiple helper memory cells mentioned in any embodiment among embodiments shown in FIG. 7A, FIG. 7B, and FIG. 7C may be examples of the target memory cell and the Q helper memory cells #1, #2, . . . and #Q in this embodiment. Due to interference of the helper memory cell #q, the programming state of the target memory cell may go from the non-interfered programming state to the interfered programming state, but the present invention is not limited thereto. According to some embodiments, the interfered programming state and the non-interfered programming state of the target memory cell and/or the programming state of the helper memory cell #q may vary.

Figure 8B:
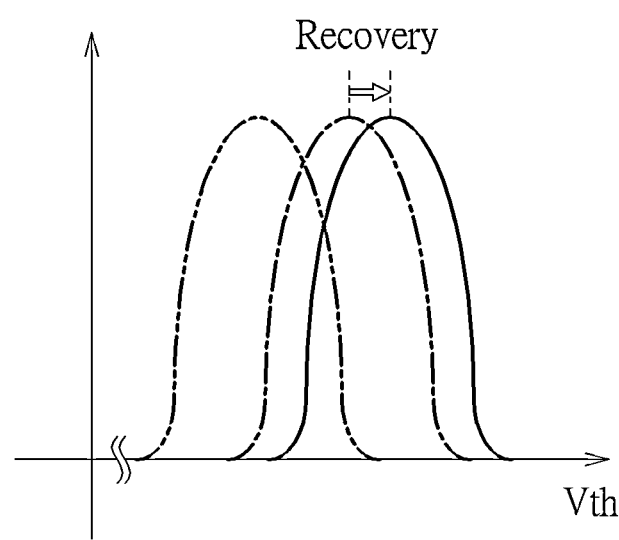
FIG. 8B is a diagram illustrating error recovery involved in the error recovery control scheme of the method according to an embodiment of the present invention, wherein the interfered programming state and the non-interfered programming state of the target memory cell and the programming state of the helper memory cell are illustrated in FIG. 8B for better comprehension.

FIG. 8B is a diagram illustrating error recovery involved in the error recovery control scheme of the method according to an embodiment of the present invention, wherein the interfered programming state and the non-interfered programming state of the target memory cell and the programming state of the helper memory cell #q are illustrated in FIG. 8B for better comprehension. The memory controller 110 may utilize the error recovery circuit 114R to perform the at least one error recovery operation according to the multiple channel values {CV}, in order to eliminate any error caused by the helper memory cell #q, and more particularly, may recover the programming state of the target memory cell from the interfered programming state to the non-interfered programming state, but the present invention is not limited thereto. According to some embodiments, the interfered programming state and the non-interfered programming state of the target memory cell and/or the programming state of the helper memory cell #q may vary.

Figure 8C:
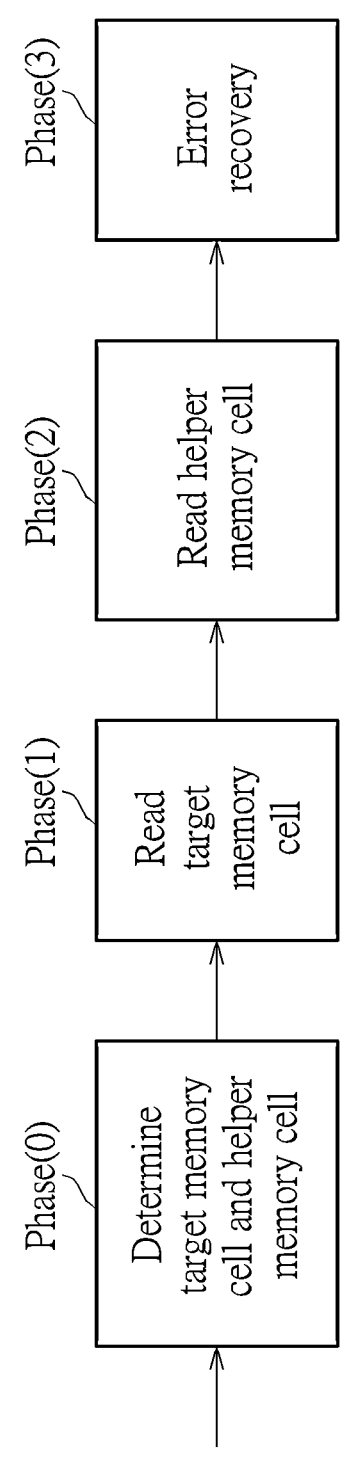
FIG. 8C is a diagram illustrating multiple phases involved in the error recovery control scheme of the method according to an embodiment of the present invention.

FIG. 8C is a diagram illustrating multiple phases Phase (0), Phase(1), Phase(2), and Phase(3) involved in the error recovery control scheme of the method according to an embodiment of the present invention. For example, the error recovery circuit 114R may determine the target memory cell (e.g., any memory cell among the set of memory cells 120C shown in FIG. 4A) and multiple helper memory cells corresponding to the target memory cell (e.g., the Q helper memory cells #1, #2, . . . , and #Q). In the phase Phase(1), the error recovery circuit 114R may read the target memory cell to generate a target memory cell read result of the target memory cell, wherein the target memory cell read result may include J channel values {CV} regarding the target memory cell obtained by performing multi-reading (e.g., by performing normal reading and the read retry procedure). In the phase Phase(2), the error recovery circuit 114R may read the multiple helper memory cells (e.g., the Q helper memory cells #1, #2, . . . , and #Q) to generate multiple helper memory cell read results #1, #2, . . . , and #Q of the multiple helper memory cells, wherein a helper memory cell read result #q of the helper memory cell #q may include J channel values {CV} regarding the helper memory cell #q obtained by performing multi-reading (e.g., by performing normal reading and the read retry procedure). In the phase Phase(3), the error recovery circuit 114R may perform error recovery upon the target memory cell according to the multiple helper memory cell read results #1, #2, . . . , and #Q, in order to eliminate any error caused by the multiple helper memory cells (e.g., the Q helper memory cells #1, #2, . . . , and #Q).

Figure 9:
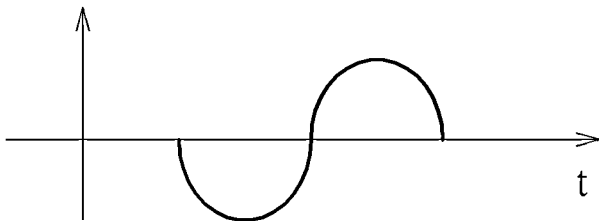
FIG. 9 is a diagram illustrating a decision feedback equalization (DFE) control scheme of the method according to an embodiment of the present invention.
Figure 9:
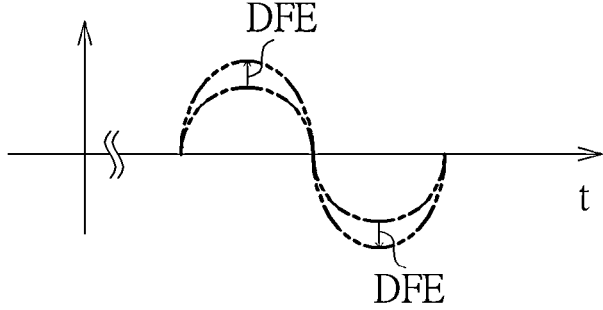

FIG. 9 is a diagram illustrating a DFE control scheme of the method according to an embodiment of the present invention, wherein the horizontal axis may represent a time t. The memory controller 110 may utilize the equalizer circuit 114E to perform the equalization (e.g., the DFE) upon read data of any memory cell among multiple memory cells (e.g., any memory cell among the set of memory cells 120C shown in FIG. 4A) of any block BLK among the multiple blocks {BLK} (e.g., multiple bits read from the memory cell), wherein the read data may include J channel values {CV} regarding the memory cell obtained by performing multi-reading (e.g., by performing normal reading and the read retry procedure), and the multiple bits may represent respective bits {B0, B1, . . . , B(m−1)} of the J channel values {CV}. The memory controller 110 may utilize the equalizer circuit 114E to perform the DFC upon the read data (e.g., the respective bits {B0, B1, . . . , B(m−1)} of the J channel values {CV}), and more particularly, may detect respective channel responses of the multiple channels {CH (i)} according to at least one predetermined channel model in order to determine related parameters of the equalizer circuit 114E, for performing the DFE regarding the channel CH(i) upon subsequent bits according to previous bits. In this way, the subsequent bits can be adjusted from a state with the ISI (labeled as "with ISI" in FIG. 9 for brevity) to a state without the ISI (labeled as "without ISI" in FIG. 9 for brevity) by the DFE. For better comprehension, soft information in the J channel values {CV} (e.g., respective soft bits {Soft_bit_org(j, k)|k=1, . . . , (m−1)} thereof, such as respective bits {B1, . . . , B(m−1)} thereof) may indicate how strong bit 1 or weak bit 1 is a certain bit in corresponding hard information (e.g. respective sign bit Sign_bit(j) thereof, such as respective bit B0 thereof) is (if Sign_bit(j)=1), or indicate how strong bit 0 or weak bit 0 is a certain bit in the corresponding hard information (if Sign_bit(j)=0), but the present invention is not limited thereto. According to some embodiments, the equalization (e.g., the DFE), the hard information and the soft information in the J channel values {CV}, and/or the hard information intensity indicated by the soft information in the J channel values {CV} may vary.

Figure 10:
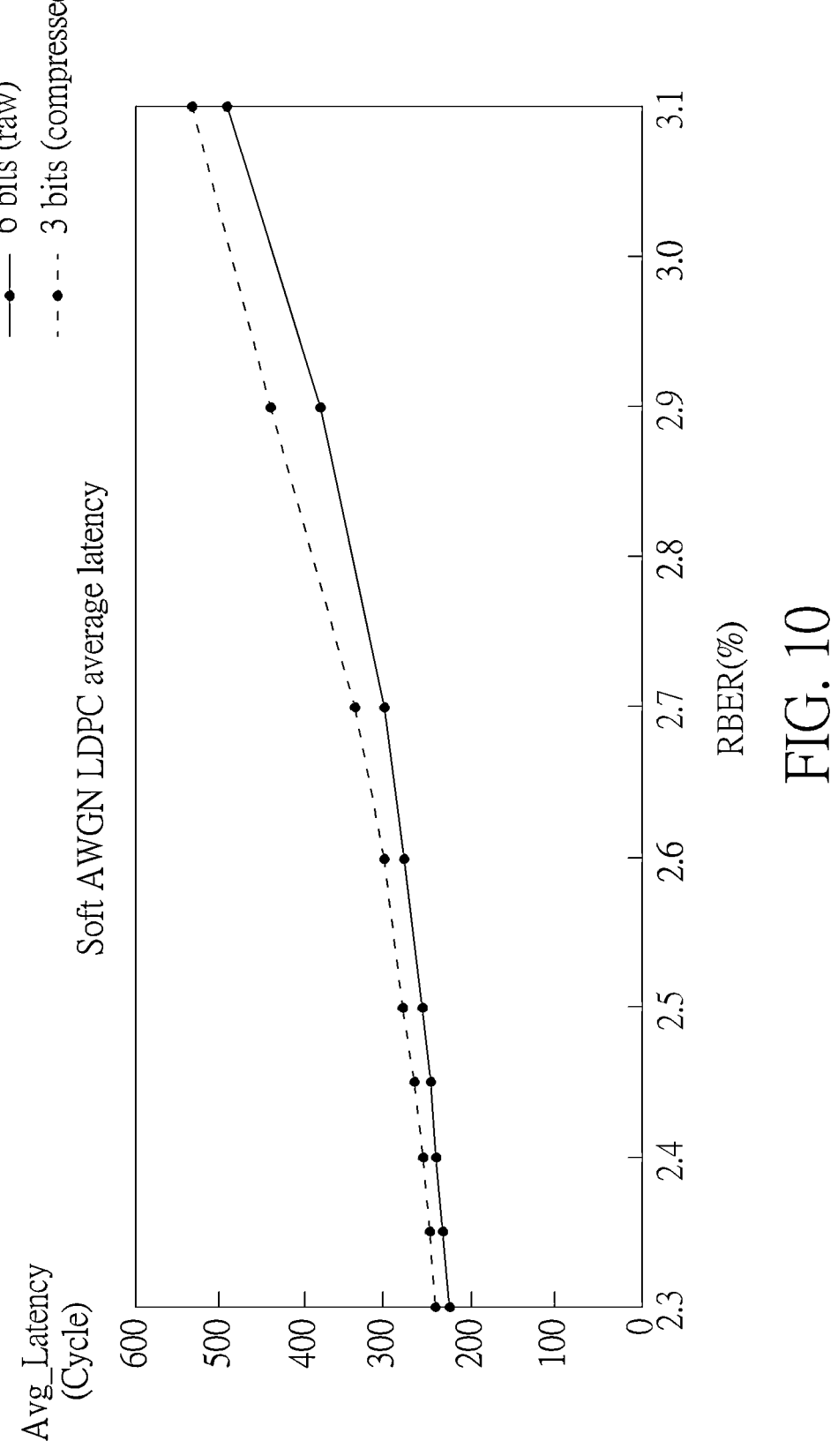
FIG. 10 is a diagram illustrating a processing result of the method according to an embodiment of the present invention.

FIG. 10 is a diagram illustrating a processing result of the method according to an embodiment of the present invention, wherein the horizontal axis may represent a raw bit error rate RBER that can be represented in units of percentage (labeled as "%" in FIG. 10 for brevity), and the vertical axis may represent an average latency Avg_Latency that can be represented in units of cycle (labeled as "Cycle" in FIG. 10 for brevity), but the present invention is not limited thereto. In addition, related configurations for obtaining the processing result may include: adopting additive white Gaussian noise (AEGN) for analyzing, and adopting LDPC code decoding as the soft decoding mechanism to generate the average latency Avg_Latency (labeled as "Soft AWGN LDPC average latency" in FIG. 10 for brevity); regarding the first LDPC code decoding control scheme shown in the upper half of FIG. 2, configuring m=6 to make the soft bit count (m–1) equal to 5; and regarding the second LDPC code decoding control scheme shown in the lower half of FIG. 2, configuring m=6 and n=3 to make the soft bit count (m–1) equal to 5 and make the soft bit count (n–1) equal to 2. As shown in FIG. 10, a relationship of the average latency Avg_Latency of the second LDPC code decoding control scheme with respect to the raw bit error rate RBER (labeled as "3 bits (compressed)" in FIG. 10 for brevity) is quite close to that of the average latency Avg_Latency of the first LDPC code decoding control scheme with respect to the raw bit error rate RBER (labeled as "6 bits (raw)" in FIG. 10 for brevity), which may indicate that performing the quantization compression can greatly reduce the memory space required for soft decoding and perform the soft decoding efficiently, without significantly affecting the overall performance.

FIG. 11 is a diagram illustrating a work flow of the read optimization procedure of the method according to an embodiment of the present invention. In response to at least one read command among the plurality of host commands, the memory controller 110 may perform the read optimization procedure according to the work flow shown in FIG. 11.

In Step S11, the memory controller 110 may perform the at least one reading operation upon the NV memory 120 through the at least one channel CH(i) among the multiple channels {CH(i)}, in order to obtain the multiple channel values {CV}. For example, any channel value CV among the multiple channel values {CV} may include the sign bit Sign_bit(j) and the (m–1) soft bits {Soft_bit_org(j, k)| k=1, . . . , (m–1)}.

In Step S12, the memory controller 110 may utilize the quantization compression circuit 208_i to perform the at least one compression operation upon the multiple channel values {CV}, in order to convert the (m–1) soft bits {Soft_bit_org(j, k)|k=1, . . . , (m–1)} in the channel value CV into the (n–1) soft bits {Soft_bit_new(j, k)|k=1, . . . , (n–1)} and thereby generate the compressed channel value $CV_{COMPRESSED}$ corresponding to the channel value CV, the compressed channel value $CV_{COMPRESSED}$ for being buffered in the volatile memory (e.g., the memory 212_i). For example, since n<m, the bit count of the (n–1) soft bits {Soft_bit_new(j, k)|k=1, . . . , (n–1)} (e.g., the soft bit count (n–1)) is less than the bit count of the (m–1) soft bits {Soft_bit_org(j, k)|k=1, . . . , (m–1)} (e.g., the soft bit count (m–1)).

In Step S13, the memory controller 110 may utilize the LDPC code decoding engine circuit 202_i to read the multiple compressed channel values {$CV_{COMPRESSED}$} that respectively correspond to the multiple channel values {CV} from the volatile memory (e.g., the memory 212_i), for performing LDPC code decoding. For example, the memory controller 110 may utilize the LLR mapping circuit 220_i to read the multiple compressed channel values {$CV_{COMPRESSED}$} that respectively correspond to the multiple channel values {CV} from the volatile memory (e.g., the memory 212_i), and perform the LLR mapping operations upon the multiple compressed channel values {$CV_{COMPRESSED}$} to generate the multiple LLR values, in order for the LDPC code decoding circuit 230_i to perform subsequent operations.

In Step S14, the memory controller 110 may utilize the LDPC code decoding engine circuit 202_i to perform the LDPC code decoding according to the multiple compressed channel values {$CV_{COMPRESSED}$} (e.g., the multiple compressed channel values {$CV_{COMPRESSED}$} read from the volatile memory (e.g., the memory 212_i) in Step S13), utilize the error recovery circuit 114R to perform the at least one error recovery operation according to the multiple channel values {CV}, and utilize the equalizer circuit 114E to perform the at least one equalization operation according to the multiple channel values {CV}, in order to generate the error-free read data for being returned to the host device 50. For example, the memory controller 110 may utilize the LLR mapping circuit 220_i of the LDPC code decoding engine circuit 202_i to read the multiple compressed channel values {$CV_{COMPRESSED}$} that respectively correspond to the multiple channel values {CV} from the volatile memory (e.g., the memory 212_i). When utilizing the LDPC code decoding engine circuit 202_i to perform the LDPC code decoding according to the multiple compressed channel values {$CV_{COMPRESSED}$}, the memory controller 110 may utilize the LLR mapping circuit 220_i of the LDPC code decoding engine circuit 202_i to perform the LLR mapping operations upon the multiple compressed channel values {$CV_{COMPRESSED}$} in order to generate the multiple LLR values, and utilize the LDPC code decoding circuit 230_i of the LDPC code decoding engine circuit 202_i to perform the at least one LDPC code decoding operation according to the multiple LLR values.

Via the read optimization procedure including the LDPC code decoding, the at least one error recovery operation, and the at least one equalization operation, the error-free read data does not have any error. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11. For example, the LDPC code decoding circuit 230_i may include at least one variable node unit (VNU), at least one barrel shifter (BS), and at least one check node unit (CNU). When utilizing the LDPC code decoding engine circuit 202_i to perform the LDPC code decoding according to the multiple compressed channel values {$CV_{COMPRESSED}$}, the memory controller 110 may utilize multiple sub-circuits of the LDPC code decoding circuit 230_i (e.g., the at least one VNU, the at least one BS, and the at least one CNU) to perform the at least one LDPC code decoding operation. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access control of a memory device, the method being applied to a memory controller of the memory device, the memory device comprising the memory controller and a non-volatile (NV) memory, the NV memory comprising at least one NV memory elements, the method comprising:

receiving a plurality of host commands from a host device for performing data access upon the NV memory according to the plurality of host commands, wherein the data access comprises data reading; and in response to at least one read command, performing a read optimization procedure for maintaining correctness of the data reading, wherein the plurality of host commands comprise the at least one read command, and the read optimization procedure comprises:

performing at least one reading operation upon the NV memory through at least one channel among multiple channels to obtain multiple channel values, wherein any channel value among the multiple channel values comprises a sign bit and multiple first soft bits;

performing at least one compression operation upon the multiple channel values to convert the multiple first soft bits in the channel value into multiple second soft bits in order to generate a compressed channel value corresponding to the channel value, the compressed channel value for being buffered in a volatile memory within the memory controller, wherein a second bit count of the multiple second soft bits is less than a first bit count of the multiple first soft bits;

reading multiple compressed channel values from the volatile memory for performing low-density parity-check (LDPC) code decoding, wherein the multiple compressed channel values correspond to the multiple channel values, respectively; and utilizing an LDPC code decoding engine circuit to perform the LDPC code decoding according to the multiple compressed channel values, and utilizing an error recovery circuit to perform at least one error recovery operation according to the multiple channel values, in order to generate error-free read data for being returned to the host device.

2. The method of claim 1, wherein the at least one reading operation comprises a first reading operation and multiple read retry operations, wherein the sign bit in the channel value is obtained from the first reading operation, and the multiple first soft bits in the channel value are obtained from the multiple read retry operations.

3. The method of claim 1, wherein any error recovery operation among the at least one error recovery operation comprises:

determining a target memory cell and multiple helper memory cells corresponding to the target memory cell;

reading the target memory cell to generate a target memory cell read result of the target memory cell;

reading the multiple helper memory cells to generate multiple helper memory cell read results of the multiple helper memory cells; and performing error recovery upon the target memory cell read result according to the multiple helper memory cell read results, for eliminating any error caused by the multiple helper memory cells.

4. The method of claim 1, wherein the step of utilizing the LDPC code decoding engine circuit to perform the LDPC code decoding according to the multiple compressed channel values, and utilizing the error recovery circuit to perform the at least one error recovery operation according to the multiple channel values in order to generate the error-free read data further comprises:

utilizing the LDPC code decoding engine circuit to perform the LDPC code decoding according to the multiple compressed channel values, utilizing the error recovery circuit to perform the at least one error recovery operation according to the multiple channel values, and further utilizing an equalizer circuit to perform at least one equalization operation according to the multiple channel values, in order to generate the error-free read data.

5. The method of claim 4, wherein the equalizer circuit represents a decision feedback equalizer circuit, and the at least one equalization operation represents at least one decision feedback equalization (DFE) operation.

6. The method of claim 4, wherein based on the read optimization procedure comprising the LDPC code decoding, the at least one error recovery operation, and the at least one equalization operation, the error-free read data does not have any error.

7. The method of claim 1, wherein utilizing the LDPC code decoding engine circuit to perform the LDPC code decoding according to the multiple compressed channel values further comprises:

utilizing a log-likelihood ratio (LLR) mapping circuit in the LDPC code decoding engine circuit to perform LLR mapping operations upon the multiple compressed channel values, in order to generate multiple LLR values; and utilizing an LDPC code decoding circuit in the LDPC code decoding engine circuit to perform at least one LDPC code decoding operation according to the multiple LLR values.

8. The method of claim 7, wherein based on the read optimization procedure comprising the at least one LDPC code decoding operation and the at least one error recovery operation, the error-free read data does not have any error.

9. A memory controller of a memory device, the memory device comprising the memory controller and a non-volatile (NV) memory, the NV memory comprising at least one NV memory elements, the memory controller comprising:

a processing circuit, arranged to control the memory controller according to a plurality of host commands from a host device, in order to allow the host device to access the NV memory through the memory controller; and a transmission interface circuit, arranged to perform communications with the host device;

wherein:

the memory controller receives the plurality of host commands from the host device through the transmission interface circuit within the memory controller, for performing data access upon the NV memory according to the plurality of host commands, wherein the data access comprises data reading; and in response to at least one read command, the memory controller performs a read optimization procedure for maintaining correctness of the data reading, wherein the plurality of host commands comprise the at least one read command, and the read optimization procedure comprises:

performing at least one reading operation upon the NV memory through at least one channel among multiple channels to obtain multiple channel values, wherein any channel value among the multiple channel values comprises a sign bit and multiple first soft bits;

performing at least one compression operation upon the multiple channel values to convert the multiple first soft bits in the channel value into multiple second soft bits in order to generate a compressed channel value corresponding to the channel value, the compressed channel value for being buffered in a volatile memory within the memory controller, wherein a second bit count of the multiple second soft bits is less than a first bit count of the multiple first soft bits;

reading multiple compressed channel values from the volatile memory for performing low-density parity-check (LDPC) code decoding, wherein the multiple compressed channel values correspond to the multiple channel values, respectively; and utilizing an LDPC code decoding engine circuit to perform the LDPC code decoding according to the multiple compressed channel values, and utilizing an error recovery circuit to perform at least one error recovery operation according to the multiple channel values, in order to generate error-free read data for being returned to the host device.

10. The memory device comprising the memory controller of claim 9, wherein the memory device comprises:

the NV memory, arranged to store information; and the memory controller, coupled to the NV memory, and arranged to control operations of the memory device.

11. An electronic device comprising the memory device of claim 10, and further comprising:

the host device, coupled to the memory device, wherein the host device comprises:

at least one processor, arranged to control operations of the host device; and a power supply circuit, coupled to the at least one processor, and arranged to provide power to the at least one processor and the memory device;

wherein the memory device provides the host device with storage space.

\* \* \* \* \*